(12) United States Patent
Lambert et al.

(10) Patent No.: US 6,276,899 B1
(45) Date of Patent: Aug. 21, 2001

(54) IMPELLER MANUFACTURING PROCESS

(75) Inventors: Tom Lambert, Upland, CA (US); Ray Piatt, Santa Fe, NM (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/435,012

(22) Filed: Nov. 5, 1999

(51) Int. Cl.⁷ .................................................... F01D 5/22
(52) U.S. Cl. .............................. 416/186 R; 416/223 R; 29/889.2
(58) Field of Search .......................... 416/186 R, 223 B, 416/213 A; 29/889.2, 889, 889.23, 889.72

(56) References Cited

U.S. PATENT DOCUMENTS

| | | | |
|---|---|---|---|
| 2,807,871 | 10/1957 | Wagner et al. | 29/156.8 |
| 3,159,106 | 12/1964 | Schumbacker et al. | 103/115 |
| 3,285,187 | 11/1966 | Anderson, Jr. | 103/115 |
| 4,155,151 | 5/1979 | Stiegelmeier | 29/156.8 CF |
| 4,322,200 | 3/1982 | Stiegelmeier | 416/184 |
| 4,392,779 * | 7/1983 | Bloemers et al. | 415/414 |
| 4,428,717 | 1/1984 | Catterfeld | 416/186 R |
| 4,720,243 | 1/1988 | Katayama et al. | 416/188 |
| 4,775,270 | 10/1988 | Katayama et al. | 409/132 |
| 5,438,755 | 8/1995 | Giberson | 29/889 |
| 5,573,374 | 11/1996 | Giberson | 416/186 R |
| 5,588,803 | 12/1996 | Vetter et al. | 416/186 R |
| 5,944,485 * | 8/1999 | Maumus et al. | 416/186 R |

OTHER PUBLICATIONS

VanDine, et al, "A Manufacturing Implementation of Precision Shrouded Impellers", Proceedings of 1997 ASME Fluids Engineering Division Summer Meeting FEDSM '97, Jun. 22–26, 1997, 1997, pp. 1–14.

* cited by examiner

*Primary Examiner*—Edward K. Look
*Assistant Examiner*—James M McAleenan
(74) *Attorney, Agent, or Firm*—Flynn, Thiel, Boutell & Tanis, P.C.

(57) ABSTRACT

A method of manufacturing an impeller, comprising machining hub, shroud and core portions, such that contacting surfaces between the hub and core, and shroud and core form mating surfaces, for mating and alignment with each other. Material is removed from the core without disturbing the contour of its surfaces, resulting in one or more vanes which mate with the respective hub and shroud portions. The mating portions are then coupled together.

22 Claims, 5 Drawing Sheets

IMPELLER MANUFACTURING PROCESS

BACKGROUND OF THE INVENTION

This invention relates to impellers for centrifugal pumps, and more specifically to a process for manufacturing impellers.

A pump impeller is composed essentially of three parts: a hub portion, vanes, and a shroud portion. Traditionally, there have been several ways to manufacture impellers. In one method, molds for the vanes are placed on top of a hub. The molds are arranged as desired for the vanes, and filled with weld material. The material fills the mold, forms the vanes, and is attached to the hub. The shroud must then be attached to the vanes.

Several other manufacturing methods use pre-fabricated vanes, which are then welded in place between the hub and the shroud. In another method, a set of long vanes are attached to the hub, extending from the edge to the center. A set of shorter blades which do not extend all the way to the center of the hub are attached to the shroud. The complementary hub and shroud are then attached, with the vanes interleaved.

Other manufacturing methods deform the impeller pieces into their respective shapes, and then attach them to each other. The impeller parts may also be cast, and then assembled.

Another impeller manufacturing method creates two preformed parts—a hub, having the vanes attached to it, and a shroud. These pieces are placed in appropriate position relative to one another by means of a five-axis machine. Once in proper position, the pieces are then electron-beam welded together. Both the use of a five-axis machine, and the process of electron-beam welding are quite expensive and require long lead times for production. Further, this method of fabricating impellers allows the potential for crevice erosion, since electron beam welding does not make a complete joint from one side of each vane to the other. There is also the potential for poor mating between the hub-vanes portion of the impeller and the shroud portion of the impeller, since the respective surfaces of the shroud and vanes that are in contact with each other may not match up, and the intersection of the surfaces may leave gaps between them. In addition to allowing voids or gaps between the surfaces, when the shroud and the vanes are not specifically matched to one another, there is a likelihood of improper or imprecise alignment. In addition, the integrity of electron-beam welds between the shroud portion and the hub-vanes portion is unknown, in part due to the variation in surface contact. Finally, the cost of machining, assembling and welding the shroud and hub-vanes portions of the impeller, first utilizing a five-axis machine and then subsequently electron-beam welding the portions together is very high, both from a monetary and a time-management viewpoint.

Thus there exists the need for an economical process to manufacture high-strength, precision impellers, including hub, vane, and shroud components which fit together in a mating fashion, preventing large gaps between the components and ensuring proper alignment of the components.

SUMMARY OF THE INVENTION

The present invention is embodied in a method for manufacturing an impeller from three component portions—a hub, a core, and a shroud. A core, with first and second surfaces, is machined. A shroud, with a second surface that mates with the first surface of the core, is machined. For example, if there is a protrusion on the first surface of the core, there would be a matching recess on the second surface of the shroud, such that the surfaces would mate together. A hub, with a first surface which mates with the second surface of the core, is machined. Material is removed from the sides of the core, without disturbing the profile of its first and second surfaces, such that the remaining material of the core forms one or more vanes. The vanes formed from the core are placed on the first surface of the hub, such that the second surface of the vanes contacts the first surface of the hub, with the mating surfaces aligning the vanes and hub relative to one another. The second surface of the shroud is then placed on the first surface of the vanes, with the weight of the shroud acting to align the shroud with the vanes.

A feature of this method of manufacturing an impeller is that the components are mated to one another, and thus their contacting surfaces fit together tightly, without significant voids between them. This is important to strengthen the subsequent connection between the portions, by providing the contacting surfaces to be at a relatively fixed distance from one another, allowing for proper welding or other connection.

Another feature of this method is that the components may be individually machined, reducing the cost and time for such operation.

Another feature of this method is that the overall cost is reduced, as no casting or molding of the vanes is necessary. Economical machining is used, and there is no need for further deformation, or for expensive machinery to finish and align the components.

Another feature of this method is that because the components are mated with one another, when they are placed in the correct radial position the components self-align relative to one another. Thus the contacting surfaces are precisely aligned, and can be brazed rather than welded, providing a tight fit without gaps.

Another feature of this method is that the upper and lower surfaces of the vanes, which will mate with the shroud and hub respectively, are machined when the core is a single component, reducing the time and expense which would be required to individually machine the upper and lower surface of each vane, and increasing the precision of the mating surfaces.

Other features and advantages of the present invention will become apparent from the following description of the preferred embodiments, taken in conjunction with the accompanying drawings, which illustrate, by way of example, the principles of the invention.

DESCRIPTION OF THE DRAWINGS

The details and features of the present invention may be more fully understood by referencing the detailed description and drawings, in which.

DETAILED DESCRIPTION OF THE INVENTION

Figure 1:
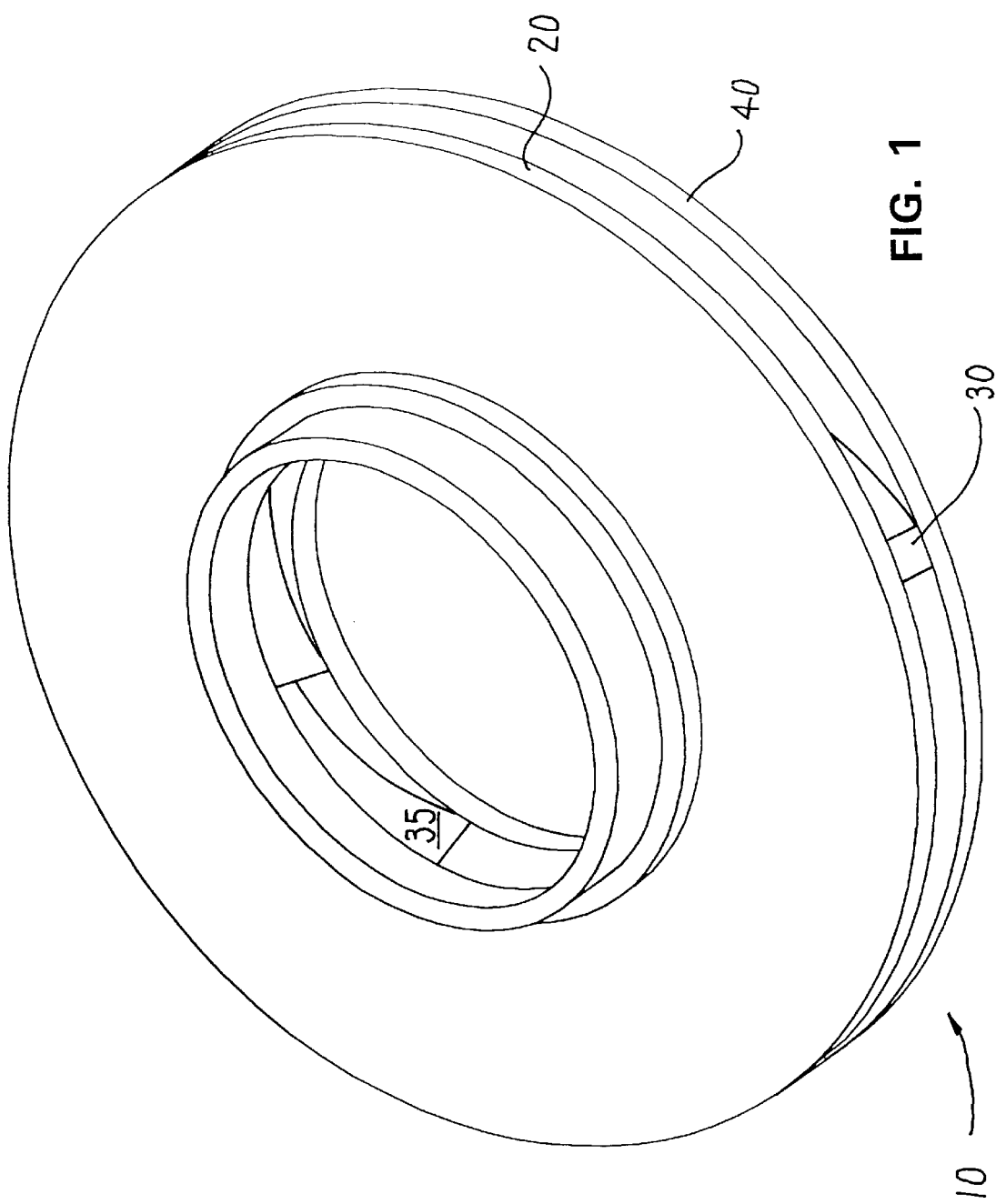
FIG. 1 is a perspective view of an assembled impeller manufactured in accordance with the present invention.
Figure 2:
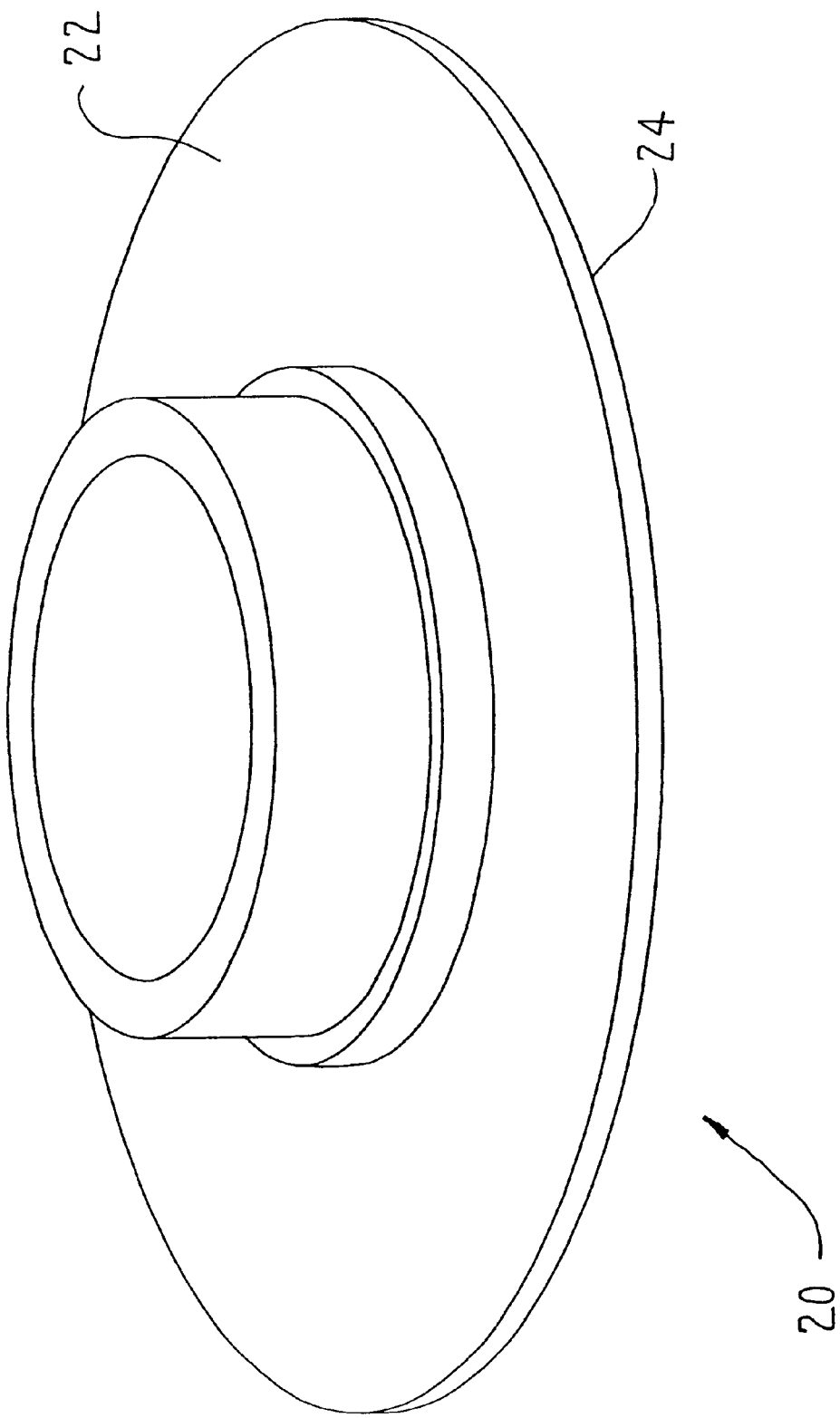
FIG. 2 is a perspective view of an impeller shroud manufactured in accordance with the present invention.
Figure 3:
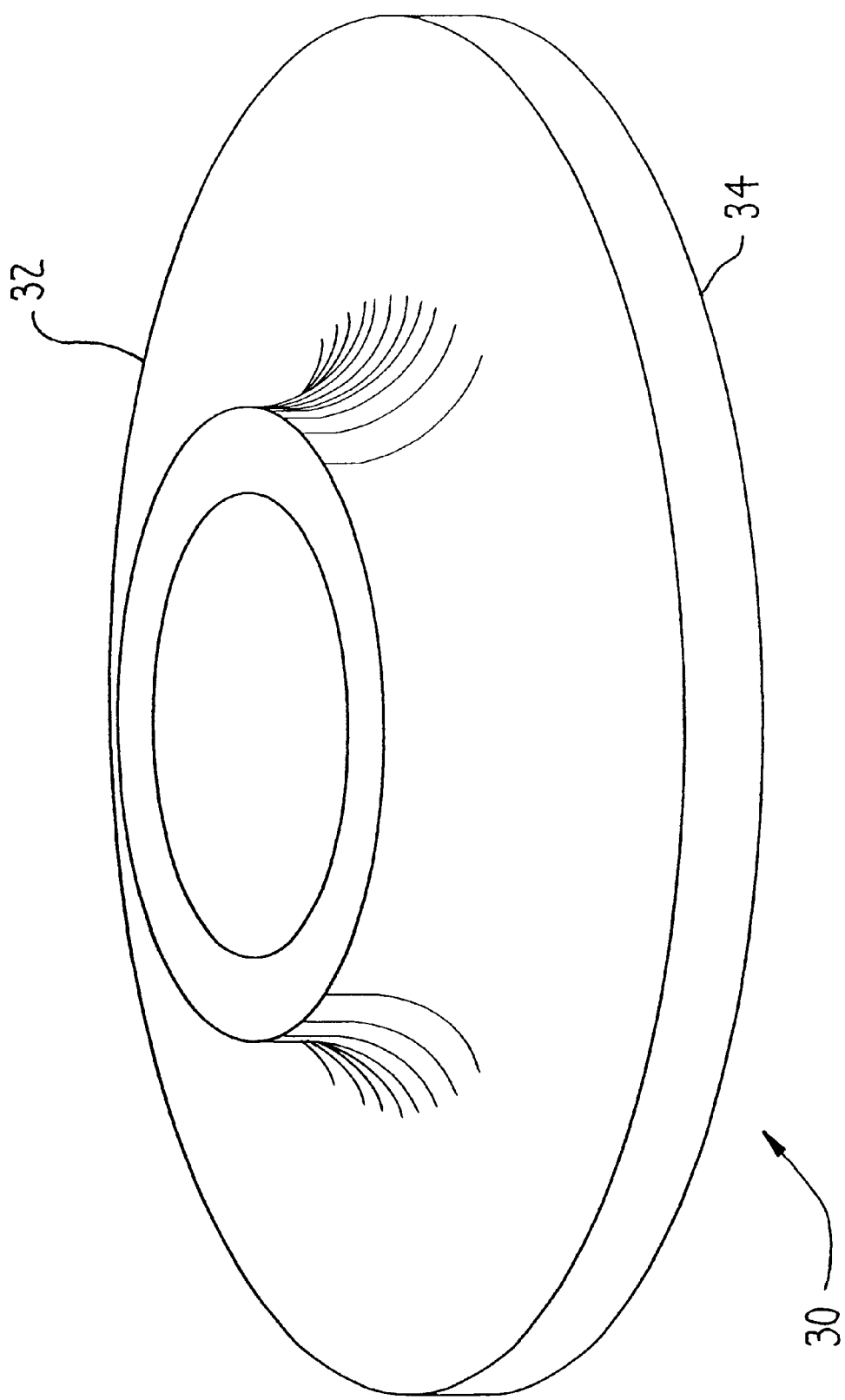
FIG. 3 is a perspective view of a solid impeller core manufactured in accordance with the present invention.
Figure 4:
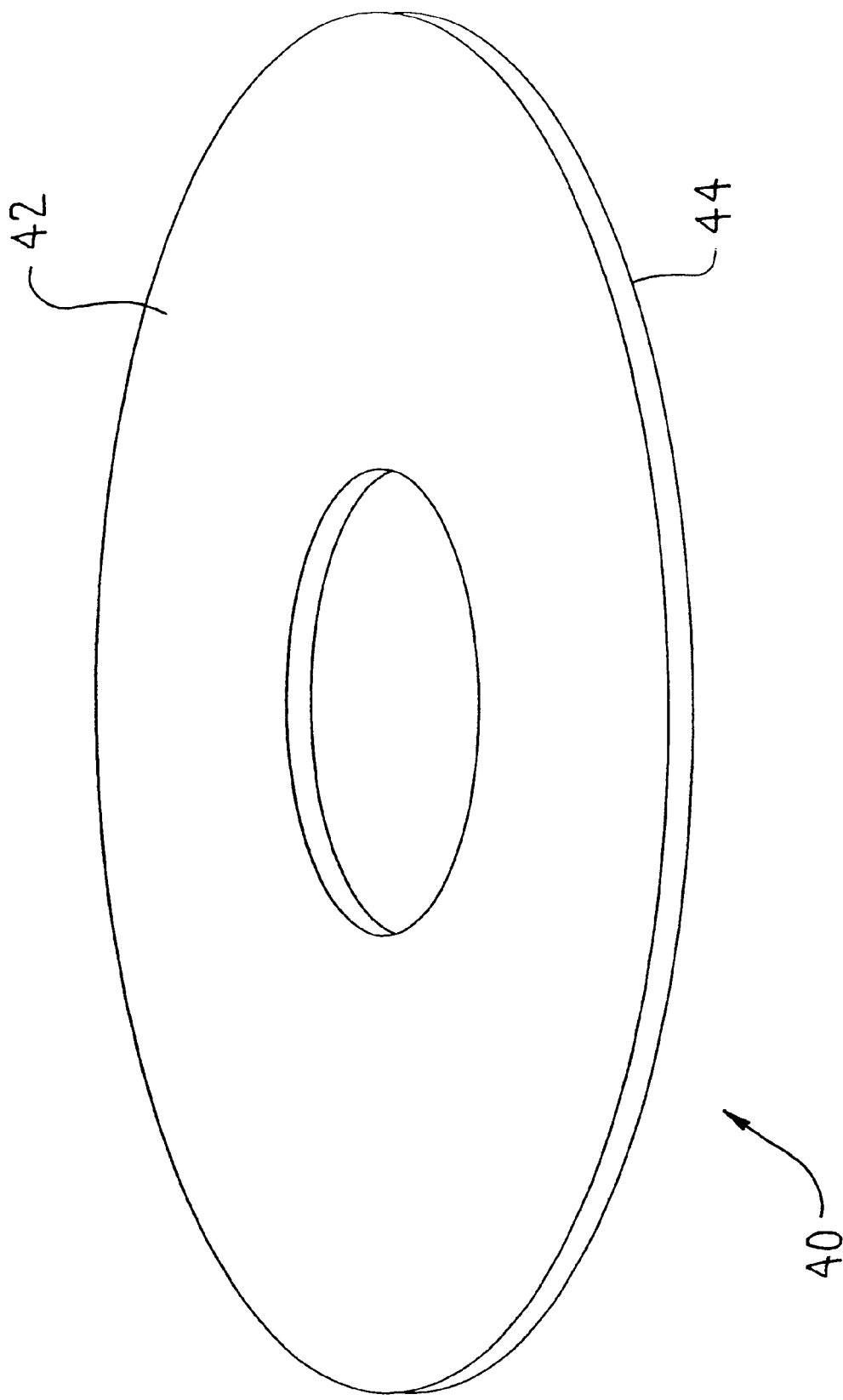
FIG. 4 is a perspective view of an impeller hub manufactured in accordance with the present invention.

As illustrated in FIGS. 1–4, the impeller 10 includes three portions—a shroud 20, a core 30, and a hub 40. These portions are individually machined.

The core 30 has a first surface 32, and a second surface 34. The shroud 20 has a first surface 22 and a second surface 24. The hub has a first surface 42 and a second surface 44.

The first surface 32 of the core 30 and the second surface 24 of the shroud 20 are machined to define surfaces which will mate with one another. Preferably, this machining is done by turning the parts on a CNC lathe. However, it will be appreciated by those skilled in the art that any other machining techniques or devices which provide the necessary precision may also be used. Similarly, the second surface 34 of the core 30 and the first surface 42 of the hub 20 are machined to define surfaces which will mate with one another. In a preferred embodiment, the respective mating image surfaces 32, 24 and 34, 42 define complex contours specified by hydraulic drawings.

Figure 5:
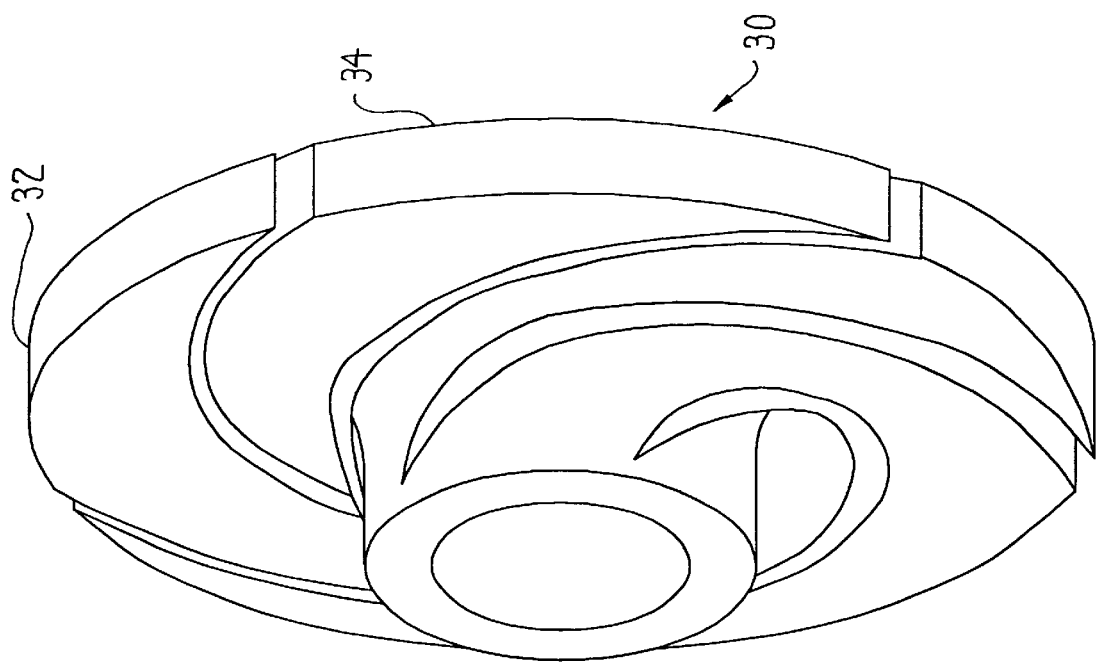
FIG. 5 is a side-by-side perspective view of a core portion of the solid impeller core of FIG. 3 next to a set of vanes formed by the removal of material from the solid impeller core.
Figure 5:
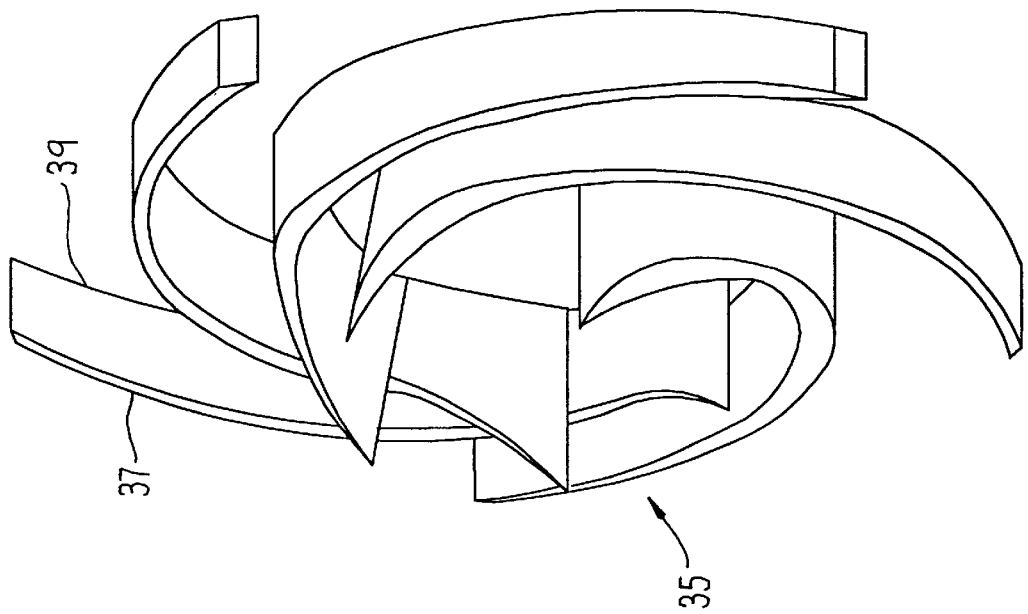

As illustrated in FIG. 5., material is removed from sides of the core 30 to form vanes 35. However, the profile of the first surface 32 and second surface 34 of the core 30 is not disturbed. The first 32 and second 34 surfaces of the core 30 correspond with first 37 and second 39 surfaces of the vanes, which mate with the second surface 24 of the shroud and the first surface 42 of the hub 40, respectively. In one embodiment, the material is removed from the sides of the core using a five-axis water jet machine. In another embodiment, the material is removed from the sides of the core by wire electric discharge machining.

The impeller is then assembled. The vanes 35 are placed on the hub 40, such that the second surface 39 of the vanes 35 mates with the first surface 42 of the hub 40. Preferably, a CNC lathe having a "U" axis is used to machine the hub, so that the chuck or spindle may be precisely radially positioned during the machining cycle program, and the position of the vanes may be "marked" with the point of a turning tool. It will be appreciated by those skilled in the art that in another embodiment, the proper radial position of the vanes is manually marked on the hub prior to assembly, so that the vanes may be properly spaced apart from one another. In one embodiment, a mark on the hub designates the outer diameter of the vane. It will be appreciated by those skilled in the art that the position of the vanes could also be specified by marks on the hub corresponding to the inner diameter of the vane, the midpoint of the vane, or any other point designated along the vane. The matching surfaces of the hub 40 and vanes 35 act to align the hub and vanes with respect to one another, and in conjunction with the marking on the hub, ensure that the vanes 35 are aligned properly. Preferably, the vanes are equally spaced on the diameter of the hub 40. In one embodiment, when the material is removed from the core 30, from three to seven individual vanes 35 are formed. It will be appreciated by those skilled in the art that a single vane could be formed, or a plurality of vanes, including more than seven vanes, could also be formed.

The shroud 20 is placed on the vanes 35, such that the second surface 24 of the shroud 20 mates with the first surface 37 of the vanes 35. The matching surfaces of the shroud 20 and vanes 35 act to align the shroud and vanes with respect to one another, ensuring that the shroud 20 is aligned properly with the vanes 35. In one embodiment, the weight of the shroud 20 acting on the first surface 37 of the vanes and the second surface of the shroud is sufficient to force the shroud into proper alignment with respect to the vanes.

The assembled hub, vanes and shroud are then brazed together. In one embodiment, brazing foil, preferably from 0.002 to 0.003 inches in thickness, is placed between the hub and vanes prior to assembly, and between the vanes and shroud prior to assembly. A brazing paste, applied between the respective components in a thickness of 0.002 to 0.003 inches could also be used.

Another method of connection is "plug" welding. This technique uses a mechanical connector, such as a dowel or screw, to hold the components together. The connector is recessed or countersunk. The components are then welded together, over the connector, so that the connector is covered by weld material. The weld material is then machined to a smooth surface. It will be appreciated by those skilled in the art that other methods of connecting the hub, vanes and shroud could also be used. These methods include, but are not limited to:

1) Pinning or screwing the components in place, then "plug" welding the components together;
2) Machining holes in the shroud, and machining matching lugs on the vanes, then "plug" welding the ends of the lugs to the shroud (It should be noted that this method of attachment also provides a method of positioning the vanes);
3) High pressure induction welding the components together. It will be further appreciated that the components could also be attached by other types or methods of welding, such as electron-beam welding, by soldering, by mechanical or adhesive attachment, or any other coupling method known in the art.

It will also be appreciated by those skilled in the art that the order of manufacture and machining may be varied, so long as the first surface of the core mates with the second surface of the shroud, and the second surface of the core mates with the first surface of the hub. In addition, the order of assembly may also be varied.

Although the invention has been described in detail with reference only to the preferred embodiments, those having ordinary skill in the art will appreciate that various modifications can be made without departing from the spirit and scope of the invention. Accordingly, the invention is defined with reference to the following claims.

What is claimed is:

1. A method of manufacturing a pump impeller, comprising:

machining a core portion of the impeller, the core portion having a first surface and a second surface;

machining a shroud portion of the impeller, having a first surface and a second surface, wherein the second surface of the shroud portion is machined to mate with the first surface of the core portion;

machining a hub portion of the impeller, having a first surface and a second surface, wherein the first surface of the hub portion is machined to mate with the second surface of the core portion;

removing material from the core portion of the impeller, such that the remaining material forms one or more vanes, each of the one or more vanes having first and second surfaces formed from the first and second surface of the core portion, surfaces of each vane remains the same as the profile of the first and second surfaces of the core portion;

placing the second surface of each vane on the first surface of the hub portion;

placing the second surface of the shroud portion on the first surface of vane;

coupling the hub, vane and shroud portions together to form an impeller.

2. A method of manufacturing as in claim 1, wherein the material is removed from the core portion of the impeller by water jet cutting.

3. A method of manufacturing as in claim 1, wherein the material is removed from the core portion by wire electric discharge machining.

4. A method of manufacturing as in claim 1, further comprising inserting brazing foil between the first surface of the hub and the second surface of the vanes, and between the second surface of the shroud and the first surface of the vanes.

5. A method of manufacturing as in claim 1, wherein the second surface of the shroud defines contours.

6. A method of manufacturing as in claim 1, wherein the first surface of the hub defines contours.

7. A method of manufacturing as in claim 1, wherein either the first or second surface of the core defines contours.

8. A method of manufacturing as in claim 1, wherein either the first or second surface of each vane defines contours.

9. A method of manufacturing as in claim 1, wherein the hub, vane(s) and shroud are coupled by brazing.

10. A method of manufacturing as in claim 1, wherein the hub, vane(s) and shroud are coupled by welding.

11. A method of manufacturing as in claim 1, wherein the hub, vane(s) and shroud are coupled by soldering.

12. A method of manufacturing as in claim 1, wherein a plurality of vanes are formed from the core, each vane having a first and second surface.

13. A method of manufacturing as in claim 1, wherein the vanes are equally spaced on the diameter of the hub portion.

14. A method of manufacturing as in claim 1, further comprising marking the first surface of the hub portion with a mark for each vane, and aligning a known point on the second surface of each vane with a respective mark on the first surface of the hub portion.

15. A method of manufacturing as in claim 14, wherein the known point on the second surface of the vane is the outer diameter of the vane.

16. A method of manufacturing as in claim 14, wherein the known point on the second surface of the vane is the inner diameter of the vane.

17. A method of manufacturing as in claim 14, wherein the known point on the second surface of the vane is the midpoint of the vane.

18. A method of manufacturing as in claim 1, wherein the weight of the shroud portion correctly aligns the shroud portion of the vanes.

19. A method of manufacturing as in claim 1, wherein the core, shroud and hub portions are machined, and the material is removed from the core portion to form vanes, and then the vanes are placed on the hub portion, and then the shroud portion is placed on the vanes, and the hub portion shroud portion and vanes are coupled together.

20. An impeller, comprising a shroud, a hub, and a plurality of vanes therebetween, each vane having a first surface and a second surface, wherein the shroud, hub and vanes are all separate components, with the first surface of each vane coupled to the shroud, and the second surface of each vane coupled to the hub wherein the plurality of vanes are formed from a single core of metal material.

21. An impeller as in claim 20, wherein the vanes are respectively coupled to the shroud and hub by welding.

22. An impeller as in claim 20, wherein the vanes are respectively coupled to the shroud and hub by brazing.

* * * * *

UNITED STATES PATENT AND TRADEMARK OFFICE
CERTIFICATE OF CORRECTION

PATENT NO. : 6,276,899 B1
DATED : August 21, 2001
INVENTOR(S) : Tom Lambert et al.

Page 1 of 1

It is certified that error appears in the above-identified patent and that said Letters Patent is hereby corrected as shown below:

Column 4,
Line 61, after "portion," insert -- respectively, such that the profile of the first and second --.
Line 67, after "of" insert -- each --.

Column 5,
Line 11, after "hub" insert -- portion --.
Line 12, after "shroud" insert -- portion --.
Line 15, after "shroud" insert -- portion --.
Line 17, after "hub" insert -- portion --.
Line 19, after "core" insert -- portion --.
Line 24, after "shroud" insert -- portions --.
Line 26, after "shroud" insert -- portions --.
Line 28, after "shroud" insert -- portions --.
Line 30, after "core" insert -- portion --.

Column 6,
Line 21, after "and" insert -- then --; after "portion" (second occurrence) insert -- , --.

Signed and Sealed this

Fourteenth Day of May, 2002

*Attest:*

*Attesting Officer*

JAMES E. ROGAN
*Director of the United States Patent and Trademark Office*